United States Patent Office 3,634,380
Patented Jan. 11, 1972

3,634,380
ANTISTATIC COMPOSITIONS OF POLYOLEFINS AND N-OXYPROPYLATED AMINES
Konrad Rombusch and Friedrich Seifert, Marl, and Ursula Eichers, Recklinghausen, Germany, assignors to Chemische Werke Huls A.G., Marl, Germany
No Drawing. Filed Oct. 10, 1969, Ser. No. 865,501
Claims priority, application Germany, Oct. 12, 1968, P 18 02 807.4
Int. Cl. C08f 29/04, 29/12, 29/02
U.S. Cl. 260—93.7                                    11 Claims

ABSTRACT OF THE DISCLOSURE

Normally solid polyolefins are rendered antistatic by the uniform distribution therein of from 0.05 to 3.0% by weight of an acid addition salt of an hydroxyalkyl carboxylic acid and an oxypropylamine.

BACKGROUND OF THE INVENTION

This invention relates to polyolefins rendered antistatic by the uniform distribution therein as antistatic agent the acid addition salt of a hydroxyalkyl carboxylic acid and an oxypropylamine.

It is known that polyolefins, due to their insulating properties, tend to become charged electrostatically and accordingly attract dust and dirt. Also, they create the danger of explosions caused by spark generation when a high voltage potential is reached. These properties affect the usefulness of the molded components, films and fibers produced therefrom.

In order to avoid these difficulties, it is conventional to coat the surface of polyolefin articles with an antistatic agent. Such a technique has the disadvantage that in most cases the effectiveness is lost or diminished as the antistatic coating is worn away in use or by cleaning.

A more lasting antistatic effect is obtained by incorporating the antistatic agent into the powdered or molten polymeric material, and then producing shaped objects from these mixtures, using, as antistatic agents, polyglycol monoethers (British Patent No. 731,728, Belgian Patent No. 536,632), polyglycol monoesters (German Patent No. 1,159,637), polyglycols (French Patent No. 1,250,926), alkyl alkanolamines (United States Patent No. 2,992,199), and alkoxylated alkylene diamines (U.S. Patent No. 2,922,770).

Good results are achieved with oxyethylates of alkanols and alkylaryl phenols. However, these compounds tend to exude from the shaped article when the amount necessary to obtain an adequate antistatic effect is incorporated in the polymer.

Even better antistatic effectiveness can be achieved using a nitrogen-containing compound as the antistatic compound, such as, for example, amides and aminocarboxylic acid derivatives, primary and secondary alkylamines and oxyethylates of alkylamines and alkanolamines, and fatty acid amides. However, the most effective of these compounds, i.e., the oxyethylates of alkylamines and acylamides have the disadvantage that they are relatively easily removed from the surface of the synthetic material, e.g., with water, because of their solubility so that their effectiveness during use decreases relatively rapidly.

German published application DAS 1,247,009 and Belgian Patent 707,753 describe a process which avoids the abovementioned disadvantage by the use of salts of fatty acids but the use of these antistatic compounds causes another problem, i.e., the antistatic additives do not have sufficient diffusion velocity to the surface of the shaped article to provide the desired antistatic effect immediately after manufacture. This problem is due to the fact that the salts used as antistatic compounds have relatively high molecular weights. However, salt formation is necessary in order to lower basicity and thus reduce the incidence of adverse physiological effects, e.g., contact dermatitis, and also to reduce water solubility. It is not feasible to employ fatty acids lower than caproic acid so as to obtain salts of lower moleculer weights and thus potentially improve diffusion rates, because these salts have a substantially lower antistatic effectiveness and are objectionable because of their odor.

Thus, there exists the problem of providing additives which can be incorporated in the polymer and which exert their effect rapidly without a reduction in their antistatic effectiveness and the duration of such effectiveness.

OBJECTS OF THE INVENTION

It is therefore a principal object of the invention to provide an improved treatment of olefin resins to prevent the accumulation of static electricity thereon.

It is another object of the invention to provide an improved treatment of polyolefin resins which will impart permanent antistatic protection thereto.

It is yet another object of the invention to provide a method of imparting improved antistatic protection to polyolefins with a composition which can be used in relatively low concentrations therein.

It is still another object of the invention to provide a new class of antistatic agents for polyolefin resins which will not deleteriously affect the physical properties thereof.

It is another object of the invention to provide for a polyolefin material a class of antistatic agents which will not seep or sweat out of the resin and which will remain in an effective state.

These and other objects and advantages of the invention will become apparent from the description and examples which follow:

SUMMARY OF THE INVENTION

In accordance with this invention, the above-described problems are solved by uniformly distributing in a normally solid polyolefin from 0.05 to 3.0% by weight of an acid addition salt of the Formula I:

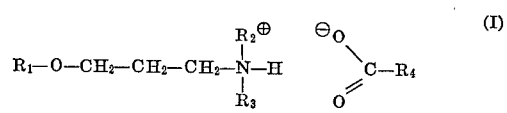

wherein $R_1$ is a hydrocarbon and is a member of the group consisting of alkyl, alkenyl, cycloalkyl, alkylcycloalkyl, aryl, alkylaryl and alkenylaryl; wherein the alkyl or alkenyl moieties contain 6–26, the cycloalkyl moieties 4–12 and the aryl moieties 6–14 carbon atoms;

$R_2$ and $R_3$ each are hydrogen, an alkyl of 1–3 carbon atoms or a group of the formula $(C_xH_{2x}O)_nH$, wherein $x$ is 2 or 3 and $n$ is 1 to 10; and $R_4$ is a hydroxyalkyl group of 1 to 4 carbon atoms.

The antistatic agents are hydroxyalkyl carboxylic acid addition salts of amines of Formula II:

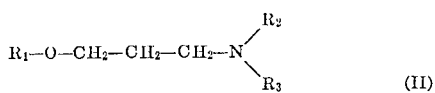

wherein $R_1$, $R_2$ and $R_3$ have the values given above. In the above formulae $R_1$ can be saturated or unsaturated and any alkyl group therein can be straight or branched chain. Preferred are those containing an alkyl group of 10–18, and more preferably 12–14, carbon atoms. The cycloalkyl groups can contain 4–12, preferably 8–12 carbon atoms, and the aryl groups can contain 6–14, preferably 6–10, carbon atoms. Suitable $R_1$ groups include but are not limited to: hexyl, n-octyl, ethylhexyl, n-nonyl, i-nonyl, n-dodecyl, n-tetradecyl, i-tetradecyl, hexadecyl, oleyl, n-octadecyl, nonylcyclohexyl, phenyl, naphthyl, heptenylnaphthyl, i-nonylphenyl, n-dodecylphenyl, i-dodecylphenyl, n-octadecylphenyl, anthracyl, octylcyclohexyl, $C_{24}$–$C_{26}$-alkylphenanthryl, oleylcyclohexyl, n-decylcyclododecyl, n-dodecylcyclobutyl, eicosyl.

Mixtures are also useful such as the amines produced from a mixture of $C_{10}$ to $C_{18}$ fatty alcohols. Preferred are the acid addition salts wherein $R_1$ is alkyl of 10 to 18 carbon atoms, e.g., decyl, undecyl, hexadecyl, octadecyl and, especially, n-dodecyl, tridecyl, and tetradecyl.

$R_2$ and $R_3$, which can be alike or different, can be hydrogen, an alkyl group of 1–3, preferably 1 carbon atoms, and most preferably a group of the formula $$-(C_xH_{2x}O)_nH$$

wherein $x$ is the integer 2 or 3, preferably 2, and $n$ is an integer from 1–10, preferably 1–3, and most preferably 1.

These free amines are obtained in a conventional manner, for example, by the chemical addition of the corresponding hydroxy compounds, such as, for example, alkanols, alkenols, alkylphenols, to acrylonitrile, followed by hydrogenation of the cyano group to the corresponding amine and, if an oxyalkylated amine is desired, then oxyalkylating the resulting amine. The oxyalkylation, which, depending on whether $x$ in the substituents $R_2$ and $R_3$ is 2 or 3, is an oxyethylation or oxypropylation, and in the absence of catalyst results in the addition of 2 mols of the alkylene oxide to the primary amine, thus producing the N,N-di-hydroxyethyl and N,N-di-hydroxypropyl derivative, respectively, of the starting amine. In the presence of catalytic amounts of an alkali, e.g., sodium hydroxide, the alkoxypropylamines can absorb up to about 500 molar equivalents of the ethylene or propylene oxide. When employing as the starting material for the catalyzed alkoxylation reaction, the N,N-di-hydroxyethyl and N,N-di-hydroxypropyl derivatives obtained without the use of catalysts, polyoxylalkyleneamines are obtained having a narrower molecular weight distribution than when reacting the primary amine with ethylene oxide in the presence of alkali. The narrower the molecular weight distribution to the desired degree of oxyethylation, the more efficient is the addition. For this reason, the last-mentioned method of preparing N,N-di-polyoxyalkylene amines is preferred.

The N-methyl- and N,N-dimethyl-oxypropyl-amines of Formula II are obtained in a conventional manner, for example, by reaction of formaldehyde and formic acid with the corresponding primary and secondary amines or by the reaction of these amines with formaldehyde and hydrogen in the presence of hydrogenation catalysts. Likewise, higher oxo compounds, e.g., acetaldehyde and propionaldehyde, butyraldehyde etc., can be empolyed, thus obtaining N-alkyl derivatives of a higher carbon number.

Acids which can be used to produce the acid addition salts have the Formula III:

wherein $R_4$ is a hydroxyalkyl group of 1–4, e.g., ε-hydroxyvaleric acid, β-hydroxybutyric acid, β-hydroxypropionic acid, glycerol acid, preferably 2 carbon atoms, e.g., glycolic acid and lactic acid. The hydroxyalkyl group preferably contains only one hydroxy group, but it may contain two hydroxy groups.

Hydroxy carboxylic acids containing more than 4 carbon atoms in the $R_4$-residue do not give the same results, as is seen in the Examples 27 and 28, compared with the Examples 1 and 18.

Suitable salts according to the invention are, for example, the glycolic acid addition salt of n-dodecyloxy-propylamine oxyethylated with 2 molar equivalents of ethylene oxide; the lactic acid addition salt of n-hexadecyloxypropylamine; the lactic acid addition salt of octadecyloxypropylamine oxypropylated with 2 molar equivalents of propylene oxide; the β-hydroxypropionic acid addition salt of n-dodecylphenyloxypropylamine oxyethylated with 20 molar equivalents of ethylene oxide; the glycolic acid addition salt of a mixture of $C_{10}$ to $C_{14}$ alkyloxypropylamines oxyethylated with 2 molar equivalents of ethylene oxide; the lactic acid addition salt of N-octadecyloxypropyl-dimethylamine; the glycerol acid addition salt of a mixture of $C_{24}$–$C_{26}$-alkyloxypropylamines oxyethylated with 12 molar equivalents of ethylene oxide; the ε-hydroxyvaleric acid addition salt of undecenylphenyloxypropylbutylamine; the β-hydroxybutyric acid addition salt of 2-ethylhexylcyclohexyloxypropylamine oxypropylated with 3 molar equivalents of propylene oxide; the glycolic acid addition salt of linolenyloxypropylamine oxyethylated with 10 molar equivalents of ethylene oxide; the lactic acid addition salt of hexylnaphthyloxypropylamine.

The acid addition salts can be prepared by heating with mixing a mixture of equimolar amounts of one or a mixture of the amines of Formula II and one or a mixture of oxyalkyl carboxylic acids of Formula III to form a homogeneous melt and then allowing the mixture to cool, or by separately dissolving both the amine and the acid in suitable solvents, mixing the solutions and evaporating the solvent from the combined solutions to dryness. The latter method eliminates substantially the danger of any discoloration of the acid addition salt.

Polyolefins which can be rendered antistatic by the acid addition salts of this invention are, for example, high- and low-pressure polymerizates, α-monoethylenically unsaturated hydrocarbons of generally about 2–8 carbon atoms, e.g. ethylene, propylene, butene-(1), pentene-(1), methylpentene-(1), etc. especially polyethylenes having molecular weights of from 15,000 to 200,000, preferably 20,000 to 180,000; polypropylenes having molecular weights from 100,000 to 1,000,000; preferably 250,000 to 600,000; and polybutenes-(1) and polypentenes-(1) having molecular weights from 300,000 to 3,000,000; preferably 1,000,000 to 3,000,000; and copolymers, block polymers and mixtures of these polymers. Polyethylene, polypropylene, polybutene-(1), and polyethylene-polypropylene block polymers and copolymers are preferred.

Also suitable are copolymers of ethylene, propylene or butylene, and mixtures of compounds of this type. These copolymers contain from 80 to 99.7, preferably 86 to 99.5 wt. percent of ethylene, the rest being propylene or butylene, or 89 to 99.7, preferably 93 to 99.5 wt. percent of propylene, the rest being ethylene or butylene, or 92 to 99.7, preferably 94 to 99.5 wt. percent of butylene, the rest being ethylene or propylene, and a molecular weight of from 30,000 to 3,500,000, preferably 50,000 to 3,000,000. A copolymer of 80 to 99.7, preferably 86 to 99.5 wt. percent of ethylene and 20 to 0.3, preferably 14 to 0.5 of butylene having a molecular weight of 15,000 to 200,000, preferably 20,000 to 180,000 can also be used. Further, copolymers for use herein can contain from 0.3 to 11, preferably 0.5 to 7 wt. percent of ethylene, and 89 to 99.7, preferably 93 to 99.5 wt. percent of propylene and have a molecular weight of 200,000 to 700,000, preferably 250,000 to 600,000.

The amounts of the above-disclosed antistatic agents which are incorporated into the polyolefins is from 0.05 to 3.0% by weight, based on the weight of the polyolefins, preferably between 0.08 and 1.0, and more preferably between 0.1 and 0.6% by weight. The preferred quantities impart complete antistatic properties to the shaped polymer, even in very dry, warm air, without impairing the flexibility and the resistance to crack formation of the highly crystalline polymers to any appreciable extent. When concentrations lower than 0.05% by weight of the antistatic compound are employed, the protection against electrostatic charging decreases markedly. However, this protection sometimes still is adequate in cool and moist air.

With a number of polyolefins, the danger of attracting dust is greatest directly after the injection molding step, due to high electrostatic charging, continuously decreases in the course of several weeks and months, so that, in this case, only a short-term antistatic rendering and thus a relatively low dosage of the antistatic agent is required. Normally, higher concentrations than 3.0% are unnecessary, since the higher concentrations do not result in any improvement and the danger of the antistatic compound exuding from the surface of the polymer becomes too great.

The novel additives can also be uniformly dispersed throughout the polyolefin in various ways. For example, the polyolefin and the antistatic agent can be converted into a homogeneous mass using a mixer. For this purpose, any commercially available high-speed mixer is generally suitable.

Also, the antistatic agent can be dissolved, dispersed, suspended, or emulsified in an appropriate organic solvent and the solution, dispersion, suspension, or emulsion can then be added to the polyolefin powder and thoroughly mixed therewith by agitation. The solvent can then be removed, for example, by heating or by distillation. An example of a solvent which is well suitable for this purpose is methanol. However, any other distillable solvent in which the antistatic compound can be uniformly mixed is for this purpose. It is also possible to incorporate the antistatic agent into the polyolefin while it is being rolled or, in case of injection or extrusion molding, while it is being injected or extruded.

Another method is to first produce a powdered or granulated form of the polyolefin having a concentration of antistatic agent higher than desired and bring this particulate polyolefin to the desired antistatic agent content during processing by adding additive-free granulated polymer thereto.

The compositions of this invention can also contain from 0.05 to 3.0% by weight of conventional antistatic agents, such as, for example, polyethylene glycols and polypropylene glycols, and monoethers and monoesters, diethers and diesters, ether esters thereof, alkylamines and the oxyethylates thereof, and fatty acid amides and the oxyethylates thereof, as well as other additives customarily used in polyolefin processing, e.g., dyestuffs, stabilizers, mold lubricants, plasticizers, extruding agents, and fillers.

It is sometimes desirable to add stabilizers to the polyolefin which prevent the yellowing which occurs when the polymer is exposed to high temperatures. Suitable stabilizers are, for instance, phosphites, particularly didecylphenyl phosphite, triphenyl phosphite, tris-(nonylphenyl)-phosphite, tris-(nonylphenol oxyethylated with 9 molar equivalents of ethylene oxide)-phosphite, which compounds can be employed in amounts of 0.01 to 0.8% by weight, based on the polyolefin.

The addition of alkanesulfonates, e.g. the sodium salt of pentadecanesulfonic acid, also has beneficial effects. For this purpose, approximately 0.05 to 2.0% by weight, based on the polyolefin, is employed as an additive in addition to the above-described antistatic compounds.

The antistatic behavior of the molded articles is tested by observing the amount of normal dust which covers the articles about 2 weeks after they are produced; by the fading of the charge with the use of the rotating field-strength measuring device according to Schwenkhagen [see M. Bühler, "Textilpraxis" (Textile Practice), 12/11, p. 1147 (1957)]; by measuring the electric surface resistance according to DIN (German Industrial Standard) 53 483, VDE 0303, Part 3; and by the so-called color test. The measurements are conducted on square molded polymer having a thickness of 1 mm. and an edge length of 100 mm., and also on larger and more complicated molded articles. Since atmospheric moisture influences the degree of electrostatic charging, all measurements are conducted at 22° C. at a relative humidity of 40%.

The ash test is conducted in the following manner:

The test plate is rubbed at a constant pressure with a cotton cloth 10 times and then is held at a distance of 0.3 cm. over crushed tobacco ash. The degree of attraction is represented by the following symbols:

$+$ =no ash attraction
$(+)$ =slight attraction
$(-)$ =medium attraction
$-$ =strong attaction The molded articles are tested in the so-called color test as follows:

The molded components are sprayed—unrubbed and rubbed—with a mixture of lycopodium, dyed blue, and sublimed sulfur, dyed red. The more intense the dust attraction and the separation of the two types of dust from each other ("color splitting") and the more Lichtenberg figures which appear, the stronger is the electrostatic charging of the shaped article.

The last three tests are conducted 5 hours, 2 days, and 7 days, respectively, after the manufacture of the molded article. In this manner, exact information is obtained as to when the full effectiveness of the antistatic additives occurs after the manufacture.

In all of the examples set forth in table form below, the molded polymer contained uniformly distributed therein 0.4% of the acid addition salt having the formula shown in the table. The acid addition salt was uniformly distributed in the polymer prior to molding by mixing it in a commercially available high speed mixer for about 10 minutes.

The polyethlyene of Examples 1–17 was low pressure polyethylene having an average molecular weight of 50,000 and a softening point of 124° C.; the polypropylene of Examples 18–22 had an average molecular weight of about 500,000 and a softening point of 151° C.; and the polybutene-1 of Examples 23–26 has an average molecular weight of 2,000,000 and a softening point of 125° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

TABLE

Added salt: $R_1O(CH_2)_3-\overset{R_2}{\underset{R_3}{N}}H^{\oplus} \quad ^{\ominus}O\overset{}{\underset{O}{\diagdown}}C-R_4$

| Ex. | Polyolefin | $R_1$ | $R_2$ | $R_3$ | $R_4$ | Accumulation of dust | Fading of charge | Surface resistance [1] ($\overline{M}\Omega$) | Ash test | Color test [1] Color splitting (separation) Not rubbed | Rubbed |
|---|---|---|---|---|---|---|---|---|---|---|---|
| 1 | Polyethylene | n-$C_{12}H_{25}$ | $C_2H_4OH$ | =$R_3$ | $CH_3$—CHOH | None | Very rapid | $2\times10^4$ / $1\times10^3$ / $8\times10^2$ | + / + / + | None / ...do / ...do | None / Do. / Do. |
| 2 | do | n-$C_{18}H_{37}$ | $C_2H_4OH$ | H | $CH_3$—CHOH | ...do | do | $1\times10^5$ / $2\times10^4$ / $6\times10^3$ | + / + / + | None / ...do / ...do | Minor / None / Do. |
| 3 | do | $C_5H_{11}$—CH—($C_2H_5$) | $C_2H_4OH$ | =$R_3$ | $CH_3$—CHOH | Minor | Rapid | $3\times10^5$ / $7\times10^4$ / $2\times10^4$ | (+) / + / + | Minor / None / ...do | Moderate / None / None. |
| 4 | do | n-$C_{22}H_{45}$ | $C_2H_4OH$ | =$R_3$ | $CH_3$—CHOH | ...do | do | $2\times10^5$ / $5\times10^4$ / $1\times10^4$ | (+) / + / + | Minor / None / ...do | Moderate / Minor / None. |
| 5 | do | n-$C_{12}H_{25}$ | $CH_3$ | =$R_3$ | $CH_3$—CHOH | None | do | $9\times10^4$ / $9\times10^4$ / $8\times10^3$ | + / + / + | None / None / ...do | Minor / Minor / Do. |
| 6 | do | n-$C_{12}H_{25}$ | $C_2H_4OH$ | =$R_3$ | $CH_2OH$ | ...do | Very rapid | $4\times10^4$ / $5\times10^3$ / $1\times10^3$ | + / + / + | None / ...do / ...do | None / Do. / Do. |
| 7 | do | i-$C_{14}H_{29}$ | $C_2H_4OH$ | =$R_3$ | $CH_2OH$ | ...do | do | $5\times10^3$ / $5\times10^3$ / $3\times10^3$ | + / + / + | None / ...do / ...do | None / Do. / Do. |
| 8 | do | n-$C_{12}H_{25}$ | H | H | $CH_3CHOH$ | ...do | do | $3\times10^4$ / $5\times10^3$ / $2\times10^3$ | + / + / + | None / ...do / ...do | None / Do. / Do. |
| 9 | do | n-$C_{10}H_{21}$ | $C_3H_6OH$ | =$R_3$ | CHOHCH$_2$—CH$_3$ | ...do | Rapid | $1\times10^5$ / $6\times10^4$ / $9\times10^3$ | (+) / + / + | None / ...do / ...do | Minor / None / Do. |
| 10 | do | n-$C_{16}H_{33}$ | $(C_2H_4O)_{10}H$ | =$R_3$ | $CH_3CHOH$ | Minor | do | $5\times10^5$ / $8\times10^4$ / $2\times10^4$ | (+) / + / + | None / ...do / ...do | Moderate / None / None. |
| 11 | do | n-$C_{16}H_{33}$ | $(C_2H_4O)_3H$ | =$R_3$ | $CH_3CHOH$ | None | do | $9\times10^4$ / $4\times10^4$ / $8\times10^3$ | + / + / + | Minor / None / ...do | Minor / None / Do. |
| 12 | do | n-$C_{18}H_{35}$ | $C_2H_4OH$ | =$R_3$ | $CH_3CHOH$ | ...do | Very rapid | $9\times10^4$ / $3\times10^4$ / $7\times10^3$ | + / + / + | None / ...do / ...do | None / Do. / Do. |
| 13 | do | Cyclododecyl | $C_2H_4OH$ | =$R_3$ | $CH_2OH$ | Minor | Rapid | $6\times10^5$ / $9\times10^4$ / $4\times10^4$ | (+) / + / + | Minor / None / ...do | Moderate / Minor / None. |
| 14 | do | Nonylphenyl | $C_2H_4OH$ | =$R_3$ | $CH_3CHOH$ | ...do | do | $3\times10^5$ / $6\times10^4$ / $1\times10^4$ | (+) / + / + | Minor / None / ...do | Moderate / Minor / None. |
| 15 | do | Naphthyl | $C_2H_4OH$ | =$R_3$ | $CH_3CHOH$ | ...do | do | $8\times10^5$ / $9\times10^4$ / $5\times10^4$ | (+) / + / + | Minor / None / ...do | Moderate / Minor / None. |
| 16 | do | n-$C_{12}H_{25}$ | $C_3H_7$ | H | $CH_3CHOH$ | ...do | do | $2\times10^5$ / $6\times10^4$ / $2\times10^4$ | (+) / + / + | Minor / None / ...do | Moderate / Minor / None. |
| 17 | do | (2) | | | | Strong | Extremely slow | >$10^7$ / >$10^7$ / >$10^7$ | − / − / − | (3) | (4) |
| 18 | Polypropylene | n-$C_{12}H_{25}$ | $C_2H_4OH$ | =$R_3$ | $C_2H_5CHOH$ | None | Very rapid | $5\times10^4$ / $8\times10^3$ / $2\times10^3$ | + / + / + | None / ...do / ...do | Very rapid / Do. / Do. |
| 19 | do | n-$C_{12}H_{25}$ | $(C_3H_6O)_2H$ | =$R_3$ | $CH_3CHOH$ | ...do | do | $9\times10^4$ / $2\times10^4$ / $9\times10^3$ | + / + / + | None / ...do / ...do | None / Do. / Do. |
| 20 | do | (5) | $(C_2H_4O)_2H$ | =$R_3$ | $CH_3CHOH$ | Minor | Rapid | $6\times10^5$ / $9\times10^4$ / $4\times10^4$ | (+) / + / + | Minor / None / ...do | Moderate / None / None. |
| 21 | do | Hexenylphenyl | $C_2H_4OH$ | =$R_3$ | $CH_3CHOH$ | None | do | $9\times10^4$ / $5\times10^4$ / $9\times10^3$ | + / + / + | None / ...do / ...do | Minor / None / Do. |
| 22 | do | n-$C_{12}H_{25}$ | $C_2H_4OH$ | =$R_3$ | $CH_3CHOH$ | ...do | Very rapid | $3\times10^4$ / $5\times10^3$ / $1\times10^3$ | + / + / + | None / ...do / ...do | None / Do. / Do. |
| 23 | Polybutene—(1) | n-$C_{12}H_{25}$ | $C_2H_4OH$ | =$R_3$ | $CH_3CHOH$ | ...do | do | $4\times10^4$ / $7\times10^3$ / $3\times10^3$ | + / + / + | None / ...do / ...do | None / Do. / Do. |
| 24 | do | n-$C_{18}H_{37}$ | $C_2H_4OH$ | H | $CH_2OH$ | ...do | do | $9\times10^4$ / $1\times10^4$ / $6\times10^3$ | + / + / + | None / ...do / ...do | None / Do. / Do. |
| 25 | do | n-$C_6H_{13}$ | $C_3H_6OH$ | =$R_3$ | $CH_3OH$ | Minor | Rapid | $9\times10^5$ / $2\times10^5$ / $6\times10^4$ | (+) / (+) / + | Minor / ...do / None | Moderate / Minor / Do. |
| 26 | do | n-$C_{12}H_{25}$ | H | H | $CH_3CHOH$ | None | Very rapid | $3\times10^4$ / $7\times10^3$ / $1\times10^3$ | + / + / + | None / ...do / ...do | None / Do. / Do. |
| 27 | Polyethylene | n-$C_{12}H_{25}$ | $C_2H_4OH$ | =$R_3$ | $C_6H_{13}CHOH$ | Strong | Slow | >$10^7$ / $6\times10^6$ / $2\times10^6$ | − / − / − | Strong / ...do / ...do | Strong / Do. / Do. |
| 28 | do | n-$C_{12}H_{25}$ | $C_2H_4OH$ | =$R_3$ | $C_{16}H_{33}CHOH$ | ...do | do | >$10^7$ / $8\times10^6$ / $5\times10^6$ | − / − / − | Strong / ...do / ...do | Strong / Do. / Do. |

[1] In each example, the uppermost row indicates the value found about 5 hours after the manufacture the molded component; the center row indicates the value found after about 2 days, and the lowermost row indicates the value found 7 days after the manufacture of the molded component.
[2] For comparison: no additive.
[3] Strong with many Lichtenberg figures.
[4] Very strong with many Lichtenberg figures.
[5] n-$C_8H_{17}$-cyclohexyl.

The preceding examples can be repeated with similar success by substituting the generically or specifically described reactants and/or operating conditions of this invention for those sued in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition comprising a normally solid polyolefin resin of at least one monoethylenically unsaturated hydrocarbon having uniformly and intimately distributed therein 0.05 to 3.0%, based on the weight of the resin, of an antistatic acid addition salt of the formula

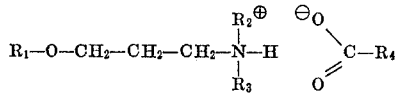

wherein
 $R_1$ is selected from the group consisting of alkyl, alkenyl, cycloalkyl, alkylcycloalkyl, aryl, alkylaryl and alkenylaryl, wherein the alkyl or alkenyl moieties contain 6–26 carbon atoms, the aryl moiety contains 6–14 carbon atoms and the cycloalkyl group contains 4–12 carbon atoms;
 $R_2$ and $R_3$ each is selected from the group consisting of hydrogen, an alkyl group of 1–3 carbon atoms and a group of the formula —$(C_xH_{2x}O)_nH$ wherein $x$ is 2 or 3 and $n$ is an integer from 1 to 10; inclusive; and
 $R_4$ is a hydroxyalkyl group of 1–4 carbon atoms.

2. The composition of claim 1 wherein $R_1$ is alkyl of 10–18 carbon atoms.

3. The composition of claim 8 wherein the polyolefin is of the formula —$(C_xH_{2x}O)_nH$ wherein $x$ is 2 or 3, and $R_3$ is hydrogen or alkyl of 1 to 3 carbon atoms.

4. The composition of claim 3 wherein $n$ is 1.

5. The composition of claim 1 wherein $R_4$ contains 2 carbon atoms.

6. The composition of claim 5 wherein $R_1$ is alkyl of 10 to 18 carbon atoms, $R_2$ is —$C_2H_4OH$ and $R_3$ is H or $CH_3$.

7. The composition of claim 1 wherein the polyolefin is in the form of a molded or extruded article or filament form and is selected from the group consisting of polyethylenes, polypropylenes, polybutenes and block polymers, copolymers and mixtures thereof.

8. The composition of claim 7 wherein $R_1$ is alkyl of 10 to 18 carbon atoms, $R_2$ is —$C_2H_4OH$ and $R_3$ is H or $CH_3$.

9. The composition of claim 8 wherein the polyolefin is polyethylene.

10. The composition of claim 8 wherein the polyolefin is polypropylene.

11. The composition of claim 8 wherein the polyolefin is polybutene-(1).

References Cited

UNITED STATES PATENTS

| | | | |
|---|---|---|---|
| 3,435,021 | 3/1969 | Rombusch et al. | 260—94.9 |
| 3,441,552 | 4/1969 | Rombusch et al. | 260—93.7 |
| 3,441,553 | 4/1969 | Rombusch et al. | 260—94.9 |
| 3,485,786 | 12/1969 | Rombusch et al. | 260—94.9 X |

FOREIGN PATENTS

| | | | |
|---|---|---|---|
| 1,504,605 | 10/1967 | France | 260—94.9 |

JOSEPH L. SCHOFER, Primary Examiner

W. F. HAMROCK, Assistant Examiner

U.S. Cl. X.R.

260—88.25, 94.9 GB, 874

UNITED STATES PATENT OFFICE
CERTIFICATE OF CORRECTION

Patent No. 3,634,380      Dated January 11, 1972

Inventor(s)    Konrad Rombusch et al

It is certified that error appears in the above-identified patent and that said Letters Patent are hereby corrected as shown below:

<u>Column 8, line 25, under Surface Resistance:</u> change "$5 \times 10^3$" to -- $8 \times 10^3$ --.

<u>Column 9, line 32, in Claim 3:</u> change "claim 8 wherein the polyolefin is" to --claim 1 wherein $R_2$ is a group--.

Signed and sealed this 9th day of April 1974.

(SEAL)
Attest:

EDWARD M. FLETCHER, JR.
Attesting Officer

C. MARSHALL DANN
Commissioner of Patents